US008695242B2

(12) United States Patent  (10) Patent No.: US 8,695,242 B2
Nelson  (45) Date of Patent: Apr. 15, 2014

(54) MOTION GREETING CARDS

(71) Applicant: American Greetings Corporation, Cleveland, OH (US)

(72) Inventor: Gary Nelson, Avon, OH (US)

(73) Assignee: American Greetings Corporation, Cleveland, OH (US)

( * ) Notice: Subject to any disclaimer, the term of this patent is extended or adjusted under 35 U.S.C. 154(b) by 0 days.

(21) Appl. No.: 13/622,397

(22) Filed: Sep. 19, 2012

(65) Prior Publication Data

US 2013/0269225 A1  Oct. 17, 2013

Related U.S. Application Data

(63) Continuation-in-part of application No. 13/447,403, filed on Apr. 16, 2012, which is a continuation-in-part of application No. 12/940,145, filed on Nov. 5, 2010, now Pat. No. 8,230,624.

(51) Int. Cl.
*G06F 1/00* (2006.01)

(52) U.S. Cl.
USPC .................. 40/124.03; 281/15.1; 446/150

(58) Field of Classification Search
USPC .......................................... 40/124.03, 124.08
See application file for complete search history.

(56) References Cited

U.S. PATENT DOCUMENTS

| | | | |
|---|---|---|---|
| 2,742,287 A * | 4/1956 | Barker | 446/150 |
| 2,927,400 A | 3/1960 | Bailey | |
| 5,139,454 A * | 8/1992 | Earnest | 446/150 |
| 5,743,035 A | 4/1998 | Bradley et al. | |
| 5,988,684 A * | 11/1999 | Blaustein et al. | 281/15.1 |
| 6,357,152 B1 | 3/2002 | Brooks et al. | |
| 6,460,277 B1 | 10/2002 | Tower | |
| 6,848,965 B2 * | 2/2005 | Wong | 446/150 |
| 7,201,402 B2 | 4/2007 | Duprey | |
| 7,634,864 B2 * | 12/2009 | Segan | 40/124.03 |
| 7,722,431 B2 * | 5/2010 | Sullivan et al. | 446/486 |
| 8,011,122 B2 * | 9/2011 | Clegg et al. | 40/124.03 |
| 8,230,624 B2 * | 7/2012 | Sapp et al. | 40/124.03 |
| 8,256,150 B2 * | 9/2012 | Qiao et al. | 40/124.03 |

(Continued)

FOREIGN PATENT DOCUMENTS

NL  1033961  12/2007

OTHER PUBLICATIONS

"Motor/Sound Module for Greeting Card", retrieved on Oct. 17, 2001 from http://www.alibaba.com/product-gs/358784246/Motor_Sound_Module_for_Greeting_Card.html.

*Primary Examiner* — Shin Kim
(74) *Attorney, Agent, or Firm* — Christine Flanagan

(57) ABSTRACT

The present invention and related disclosure describes greeting cards with moving elements or devices which are operable to create motion in connection with some portion of the greeting card. The greeting card may include a multi-panel greeting card body or a three-dimensional foam greeting card body. At least one movable object is contained upon or within the greeting card body. A sound module having at least one pre-recorded digital audio file saved therein and a motor module are contained and concealed within the greeting card body. One or more switches may be used to activate the sound and motor modules, causing the pre-recorded audio file to play and causing movement of the movable or mobile object. This movement may be up-and-down or "bouncing" motion, spinning or rotational motion, side-to-side motion or any other reciprocating motion.

20 Claims, 12 Drawing Sheets

(56) References Cited

U.S. PATENT DOCUMENTS

| | | |
|---|---|---|
| 2008/0032587 A1 | 2/2008 | Krivanek et al. |
| 2009/0040878 A1* | 2/2009 | Domes et al. ................. 368/107 |
| 2009/0126239 A1* | 5/2009 | Clegg ........................ 40/124.03 |
| 2009/0241387 A1 | 10/2009 | Wong |
| 2012/0192467 A1 | 8/2012 | Qiao et al. |
| 2012/0266503 A1 | 10/2012 | Sapp et al. |
| 2012/0304510 A1 | 12/2012 | Qiao et al. |
| 2013/0000165 A1* | 1/2013 | Mayer et al. ............... 40/124.03 |

* cited by examiner

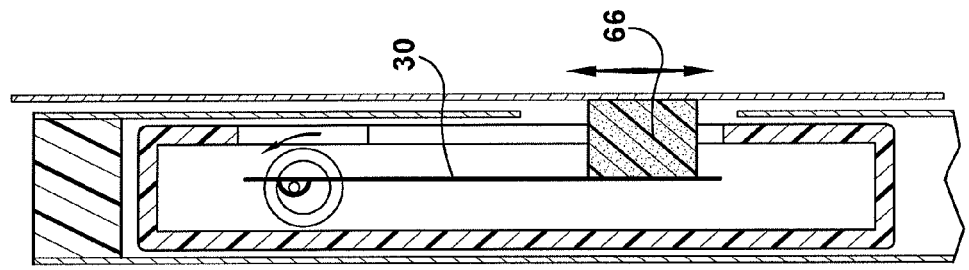
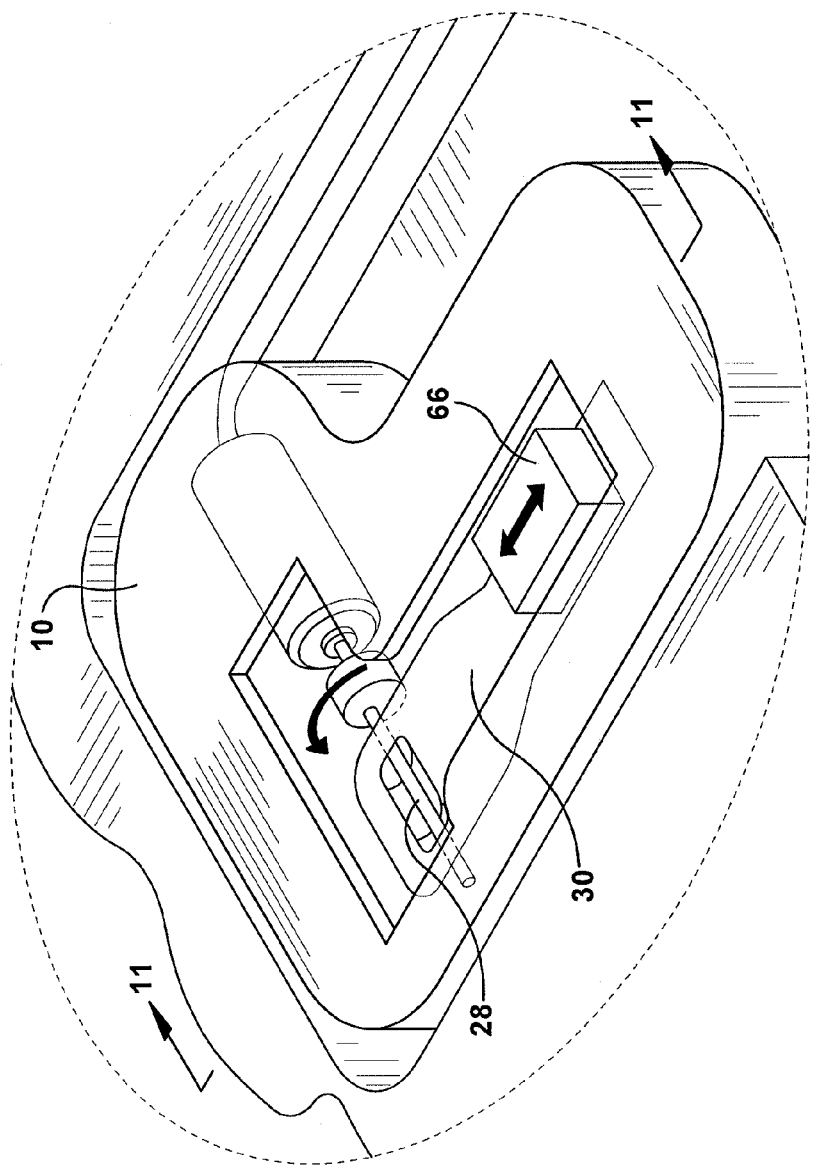

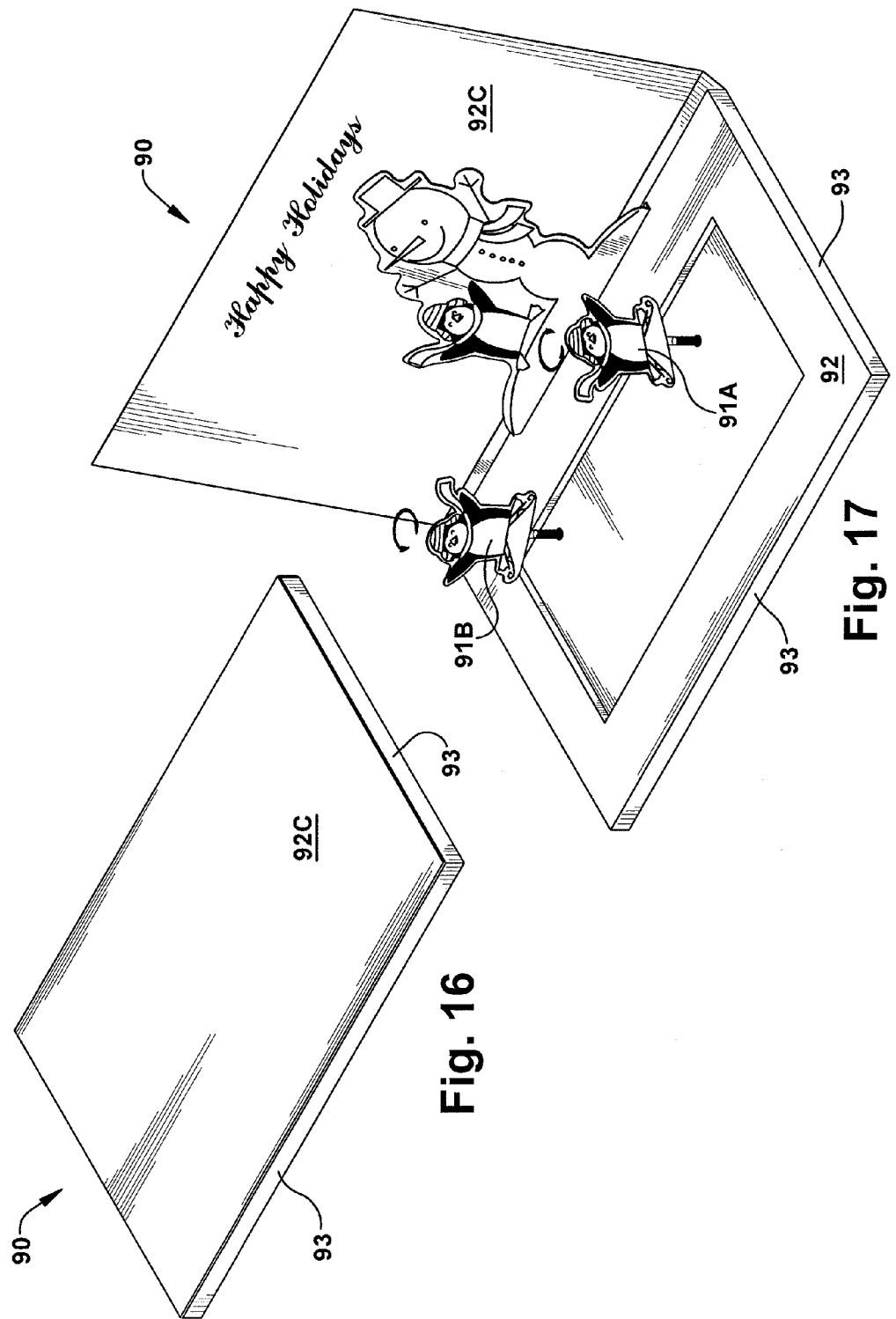

MOTION GREETING CARDS

RELATED APPLICATIONS

This application is a continuation-in-part of and claims priority to U.S. patent application Ser. No. 13/447,403, filed on Apr. 16, 2012, which claims priority to U.S. patent application Ser. No. 12/940,145, filed on Nov. 5, 2010. The aforementioned applications are incorporated by reference herein in their entirety.

FIELD OF THE INVENTION

The present invention relates to greeting cards and more specifically, to greeting cards having one or more moving elements and functions which create motion.

BACKGROUND OF THE INVENTION

For many years paper greeting cards containing text sentiment and associated artwork have been widely used for celebratory occasions such as birthdays, graduations, weddings, and for other commercial purposes. More recently, greeting cards have been enhanced by incorporating sound and other effects. Sound generating devices have been incorporated into traditional paper greeting cards to increase entertainment value and emotional impact. In some forms, a talking or musical greeting card looks just like a conventional greeting card, except that it includes a hidden sound module with a pre-recorded sound track. Opening the greeting card will automatically turn on or close a switch so that the sound module will play the pre-stored music or dialog and closing the greeting card will automatically open the switch and stop the play of the music or dialog.

There is a need in the art for a greeting card that increases the entertainment value and raises the surprise factor of traditional or sound generating greeting cards that may still be mailed to a recipient and is relatively similar in size and thickness to a traditional paper greeting.

SUMMARY OF THE INVENTION

A first embodiment of the present invention and related disclosure includes a multi-panel greeting card body, a sound module concealed between two panels of the greeting card body, a motor module concealed between two panels of the greeting card body, a mobile object attached to the motor module, a power supply, at least one pre-recorded digital audio file saved within the sound module, and a switch which activates the sound module and the motor module upon opening of the greeting card, activation of the motor module causing movement of the mobile object and activation of the sound module causing the at least one pre-recorded digital audio file to play.

Another embodiment includes a multi-panel greeting card body, a sound module, a motor module, a mobile object comprising two or more die cut pieces that are connected to each other at a connection point such that the two or more die cut pieces are pivotable about the connection point, the mobile object being attached to a connecting rod, the connecting rod being attached to the motor module and the connecting rod being concealed between the greeting card body and the mobile object, at least one die cut piece having a front surface and a back surface, the at least one die cut piece being located proximate to the mobile object, a spring mechanism that is attached at one end to the greeting card body and attached at the other end to the at least one die cut piece, a switch to activate the sound module and the motor module wherein when the sound module is activated, a pre-recorded audio clip is played and when the motor module is activated, the connecting rod and mobile object are set in motion.

Still another embodiment includes a three-dimensional foam greeting card body, a first planar surface attached to a front surface of the three-dimensional foam greeting card body, a second planar surface attached to a back surface of the three-dimensional foam greeting card body, a movable object attached to the first planar surface and connected to a motor module through an opening in the three-dimensional foam greeting card body and the first planar surface, a sound module encased and concealed within the three-dimensional foam greeting card body, a motor module encased and concealed within the three-dimensional foam greeting card body, a power source, and a push button switch, wherein when the push button switch is pressed, the sound module is activated causing a pre-recorded digital audio file to play, and the motor module is activated causing the mobile object to move or vibrate in an up-and-down motion.

Yet another embodiment of the motion greeting cards of the present invention includes a multi-panel greeting card, a sound module, a motor module having a rotating gear mechanism that when activated turns a circular gear, a mobile object attached to the circular gear of the motor module, a power supply, at least one pre-recorded digital audio file saved within the sound module, and a switch which activates the sound and motor modules module causing the at least one pre-recorded digital audio file to play and causing circular or rotational movement of the mobile object.

DESCRIPTION OF THE DRAWINGS

FIG. 10 is a perspective view of the motor of the motion greeting card of FIG. 1 and FIG. 8.

FIG. 11 is a cross-section view of the motor of FIG. 10.

FIG. 16 is a perspective view of an alternate embodiment of the motion greeting cards of the present invention, in a closed position.

FIG. 17 is a perspective view of the greeting card of FIG. 16, in an open position.

DETAILED DESCRIPTION OF PREFERRED AND ALTERNATE EMBODIMENTS

The motion greeting cards of the present invention and related disclosure combine movement with sound and a photograph, illustration or digital art to create a new and novel category of greeting card. Each embodiment features a mobile object that is powered by a small motor and which simulates motions including, but not limited to, dancing, bouncing, hopping, shaking and spinning. Audio including music, voice and/or sound effect may accompany the motion and may be triggered before, after, or simultaneously with the motion effect. The mechanized movement may be synchronized with the audio.

Figure 1:
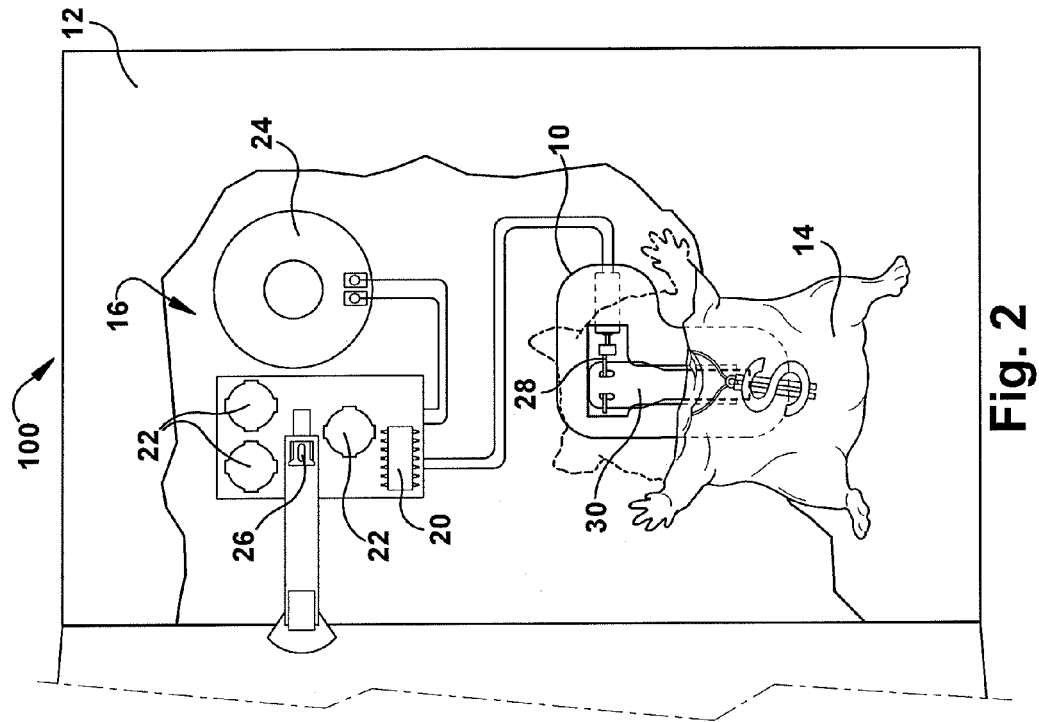
FIG. 1 is a front view of an inside panel of a first embodiment of the motion greeting cards of the present invention.
Figure 2:
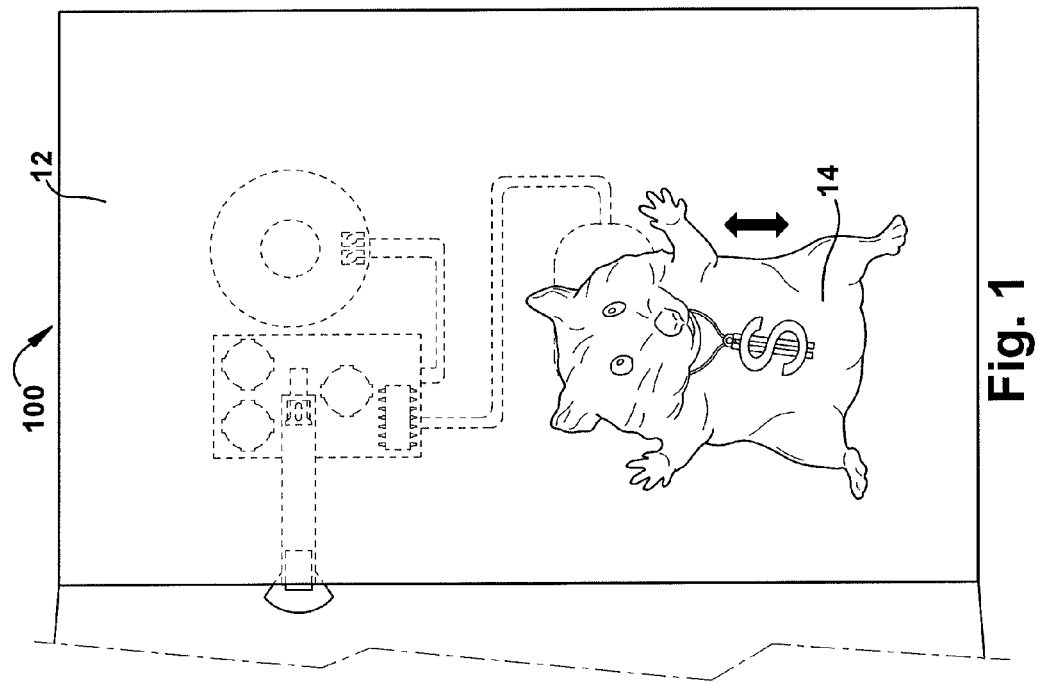
FIG. 2 is a cutaway view of the motion greeting card of FIG. 1.

A first embodiment of the motion greeting cards 100 of the present invention contains at least one motor module 10 which causes the movement or "bouncing" of at least one mobile object 14 associated with a greeting card body 12. As used herein, the term "bouncing" is used to describe up and down motion, side to side motion or any other reciprocating motion. In a preferred embodiment, the greeting card body 12 contains three greeting card panels. A first panel that is connected to a second panel along a first fold line and a third panel connected to the second panel along a second fold line. The first panel serves as the front cover of the greeting card. The third greeting card panel is folded along the second fold line such that it overlies the second panel and creates an internal cavity wherein the greeting card electronics can be concealed. The electronic components, including a sound module 16 and a motor module 10, are attached to the second panel and the second and third panels are attached, adhesively or otherwise, along at least one edge of the second and third panels. A small opening or aperture may exist on the third panel so that the motor component 10 can be connected to the moving or "bouncing" object 14 attached thereto, as shown in FIGS. 1 and 2. The sound module 16 may contain any and all components necessary to store and produce or emit sound. The motor module 10 may contain any and all components necessary to create movement of the mobile object. Some of the internal electronic components may include, but are not limited to: at least one circuit board 18; at least one integrated circuit chip 20; at least one power source 22; at least one speaker 24; at least one motor 10, at least one switch 26 and at least one pre-recorded digital audio clip. The electronic components of the greeting cards described herein are considered to be readily understood and appreciated by one of ordinary skill in the art and are therefore not discussed in detail herein. The motor 10 may be of the type shown in FIG. 2 FIG. 10 and FIG. 11, having a rotating arm 28 or shaft, which may be an offset shaft which creates oscillatory motion upon rotation of the shaft by the motor. A lightweight movement mechanism 30 is attached at one end to the rotating arm 28 of the motor 10 and at an opposite end to the greeting cards mobile object 14 via an attachment mechanism 66. In a preferred embodiment, the mobile object 14 is die cut shape of a person, animated character, animal or any other object having a substantially planar front and back surface so that it will fit within the panels of the greeting card 100 without substantially increasing the thickness of the greeting card 100. The mobile object 14 must be connected to the movement mechanism 30 which is in turn connected to the rotating arm 28 of the motor 10 so that when the motor 10 is activated, the mobile object 14 moves or "bounces". The motor 10 may be activated upon the user opening the greeting card 100. A slide switch 26 may be located across the first fold line between the first and second greeting card panels such that when the greeting card is opened, the electronic components are activated. The slide switch 26 may activate both the pre-recorded sound clip and the motor 10 so that when the greeting card 100 is opened, the pre-recorded sound clip will play along with the movement of the mobile object 14 contained within the greeting card 100. The sound clip, mobile object 14 and greeting card artwork may all be coordinated with a particular theme or occasion. The movements of the mobile object 14 may be synchronized with the audio clip such as, for example, by operation of the motor 10 while the sound module 16 is turned on, or by motion of the mobile object 14 in synch with a song, music or sound clip played by the sound module 16. Alternatively, the greeting card 100 may contain separate switches such that the sound and motion are not activated simultaneously. For example, the sound may be triggered by a slide switch 26 upon opening the greeting card 100. Once the greeting card 100 is opened, a push button or other switch mechanism may be used to activate the motion. In an alternate embodiment, where the mobile object 14 is located on the outside of the greeting card 100, such as on the front face of the card, the motion and/or sound may be triggered by a push button mechanism also located on the front face of the greeting card 100.

Figure 4:
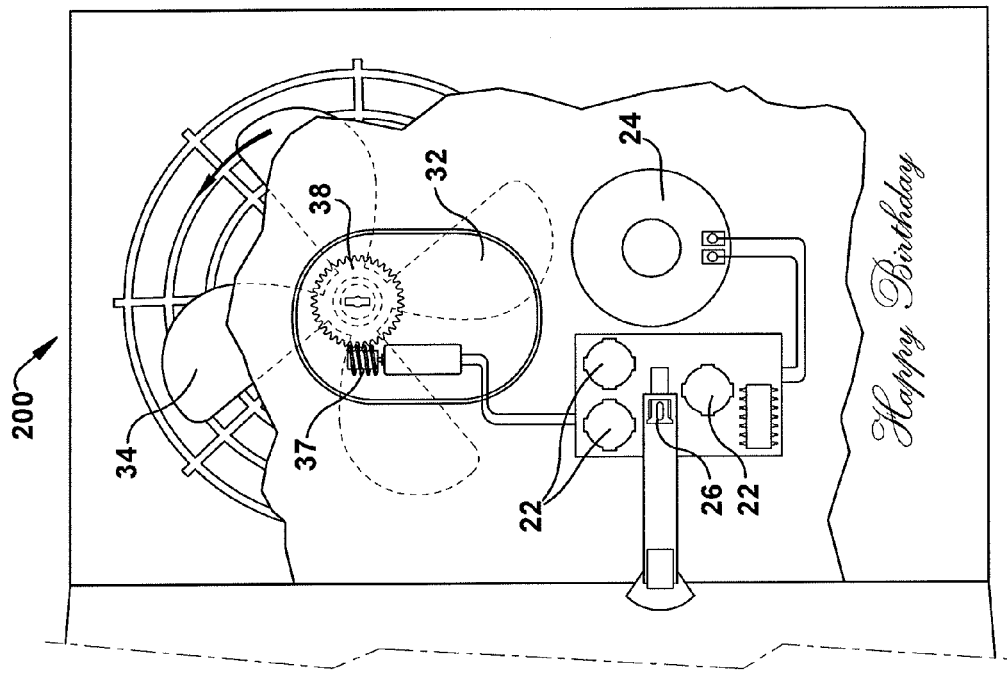
FIG. 4 is a cutaway view of the motion greeting card of FIG. 3.
Figure 3:
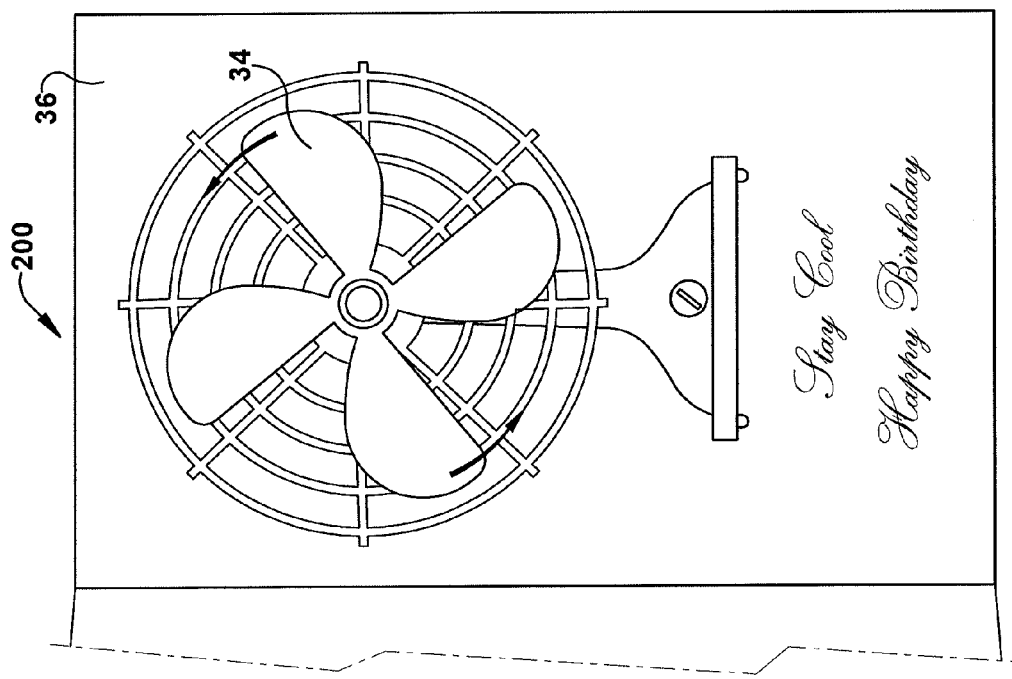
FIG. 3 is a front view of an inside panel of a second embodiment of the motion greeting cards of the present invention.

In a second embodiment, shown in FIGS. 3 and 4, the greeting card 200 contains a motor module 32 which allows one or more mobile objects 34 associated with a greeting card body 36 to spin or rotate. The greeting card body 36 configuration may be the same as described above with regard to the first embodiment, having three greeting card panels attached along a first and second fold line. The electronic components are attached to the second panel and concealed by the overlapping third panel which is attached to the second panel along at least two edges of the second and third panels. The third panel may contain a small hole or aperture to connect the motor 32 to a mobile object 34. The motor 32 may be of the type shown in FIG. 4, having a rotating gear mechanism 37 that when activated turns a circular gear 38. A connecting rod 40 is located between and connects the gear 38 and the mobile object 34 (through the hole or aperture in the third panel of the greeting card). As the gear 38 is rotated by the gear mechanism 37, it in turn causes the moveable object 34 to rotate or "spin". A slide switch 26 may activate a pre-recorded sound clip and the motor 32 upon opening of the greeting card 200. The sound and motor 32 may alternatively be activated by separate switches. The moveable object 34 may be contained on the inside of the greeting card 200 or on the outside front cover of the greeting card 200. The mobile object 34 may be a die cut shape such as a fan, a wheel or any other rotating object.

Figure 6:
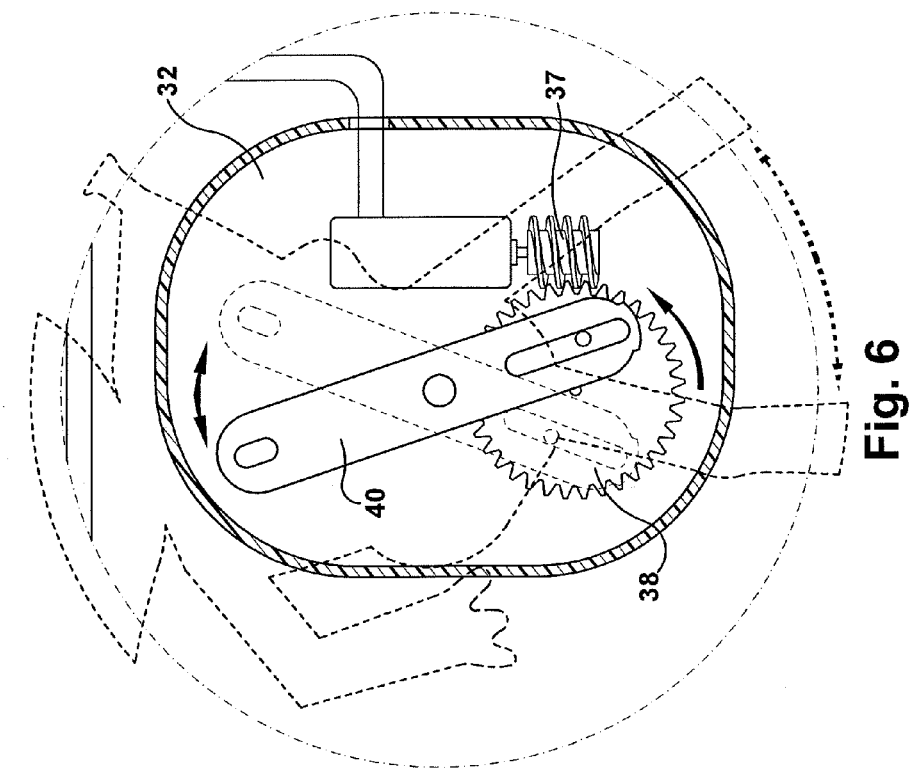
FIG. 6 is a front view of the motor module of the motion greeting card of FIG. 5.
Figure 5:
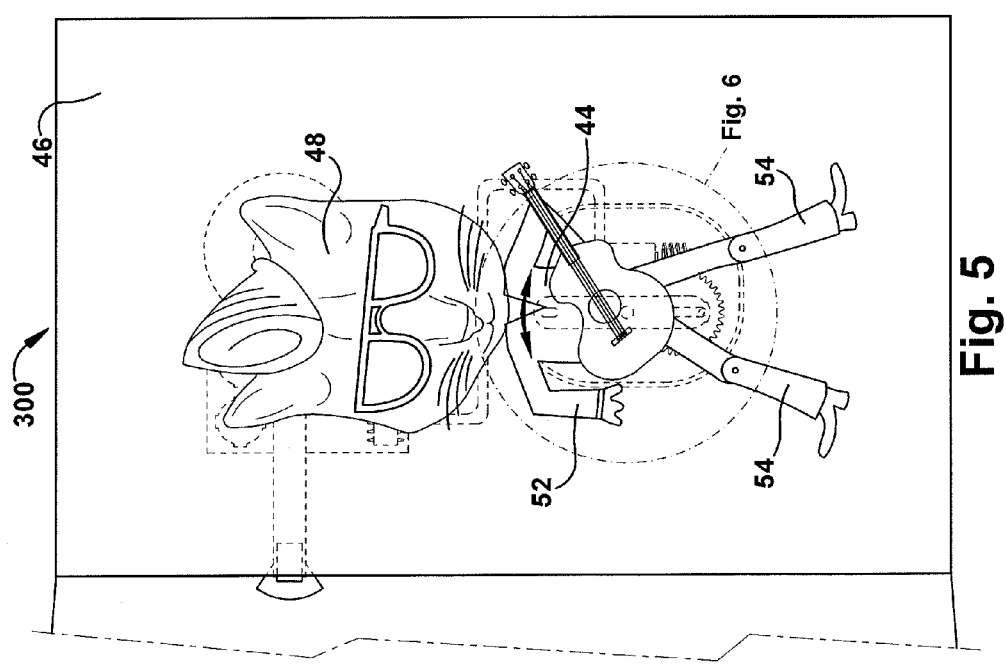
FIG. 5 is a front view of an inside panel of a third embodiment of the motion greeting cards of the present invention.

In a third embodiment, shown in FIGS. 5 and 6, the motion greeting card 300 of the present invention contains at least one motor module 42 that is associated with at least one body of a character 44 which, when activated allows the body 44 to move or to "dance" to the music or sound contained within the audio module. The greeting card body 46 may have three panels, as described above, with the second and third panels overlapping and concealing the greeting card electronics and related circuitry. The third panel may have a small opening or aperture which allows the motor 42 to be connected to the mobile object 44. The front panel may also contain a cut-out portion in the shape of the character head 48 so that it may be seen without opening the greeting card 400. The motor module 42 may be of the type shown in FIG. 6, having a rotating gear mechanism 37 that when activated turns a circular gear 38, which is in turn attached to a connecting rod 40. The mobile object 44 is attached to the other end of the connecting rod 40. The character body 44 contains several separate and distinct pieces or elements representing the arms 52, legs 54 and main body 44 of the character. Each arm 52 and leg 54 is made from two separate die cut pieces. Each of the limbs 52, 54 are connected together and to the character using fiber optic strands so that the body 44 and limbs 52, 54 may move or pivot freely about the attachment point while moving in a reciprocating motion, giving the illusion that the character is dancing. The character head 48 is separated from the body 44 and is connected to a spring mechanism 68 that connects the character head 48 to the front surface of the third greeting card panel 46 and projects the character head 48 out beyond the position of the body 44. The character head 48 projects through the front of the greeting card through the cut-out contained in the first card panel. When the greeting card is opened, the audio and motor modules 42 are activated and the character body 44 and component parts of the character body move in a reciprocating motion and appear to dance to the sound or music played by the audio module.

Figure 7:
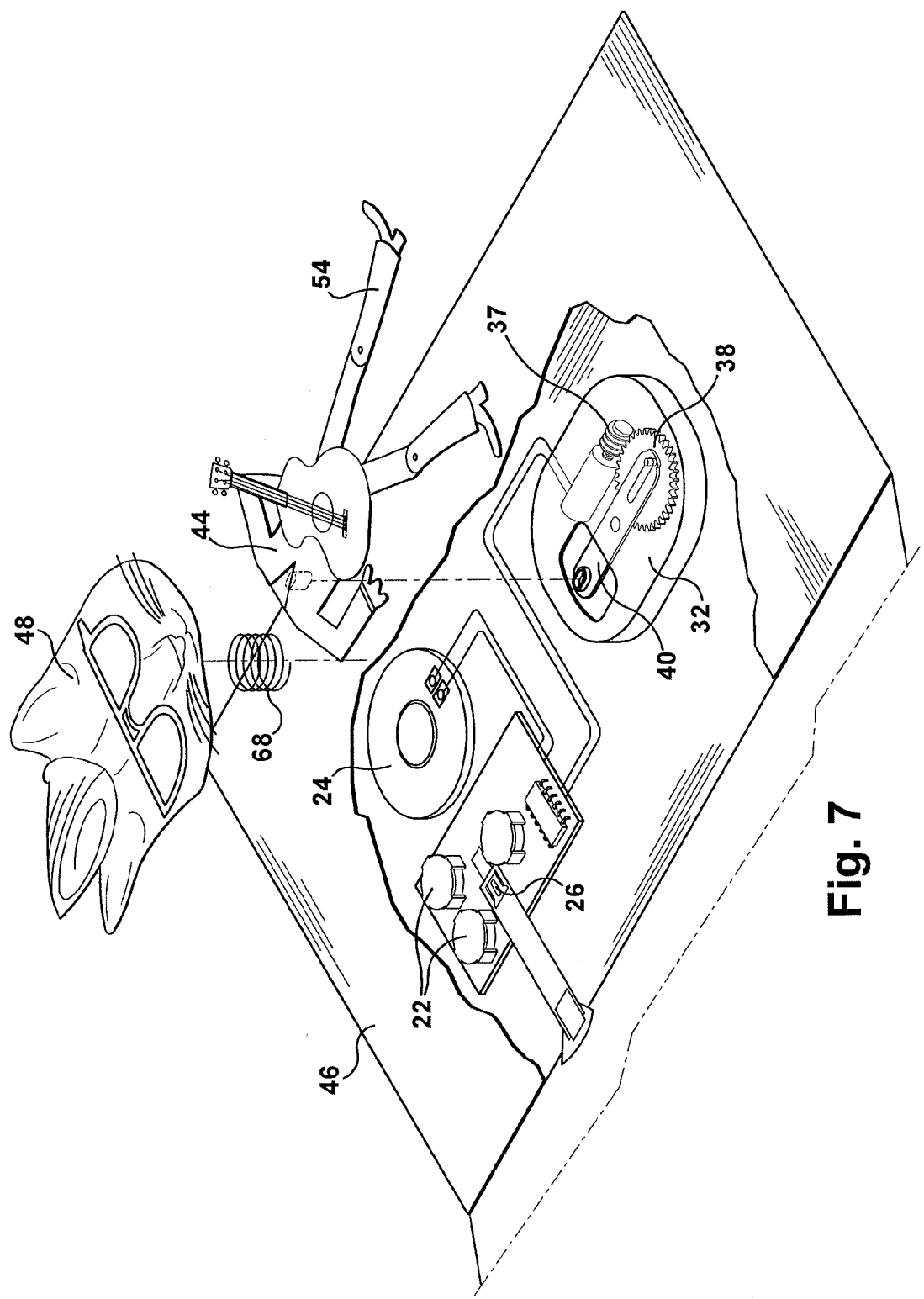
FIG. 7 is an exploded view of the inside panel of the motion greeting card of FIG. 5.
Figure 8:
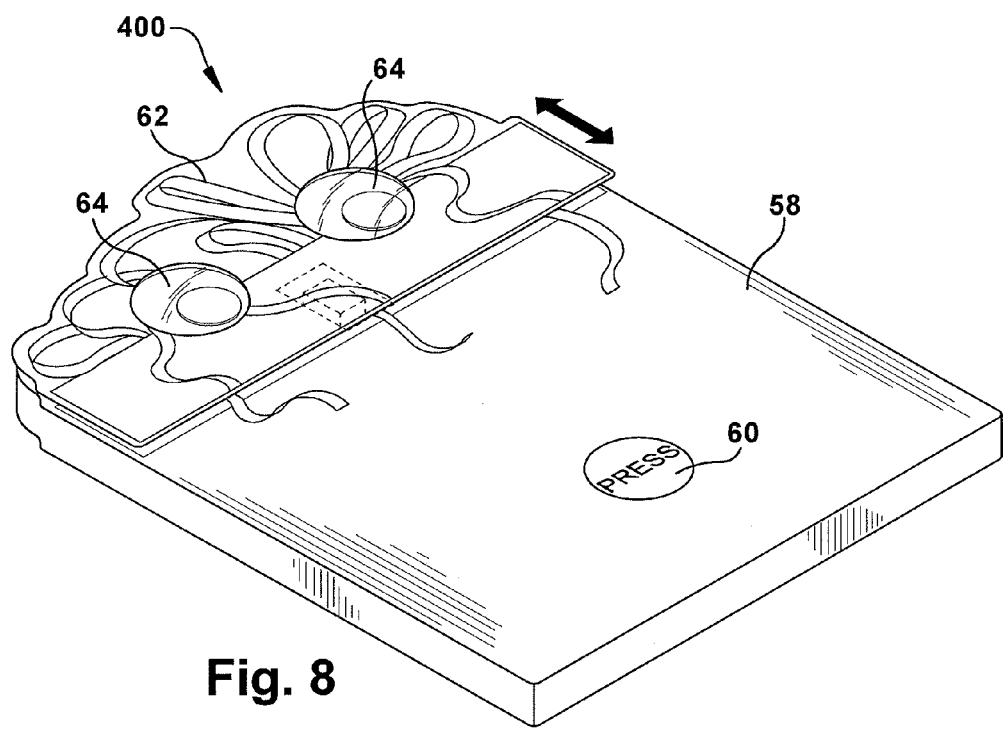
FIG. 8 is a perspective view of a fourth embodiment of the motion greeting cards of the present invention.
Figure 9:
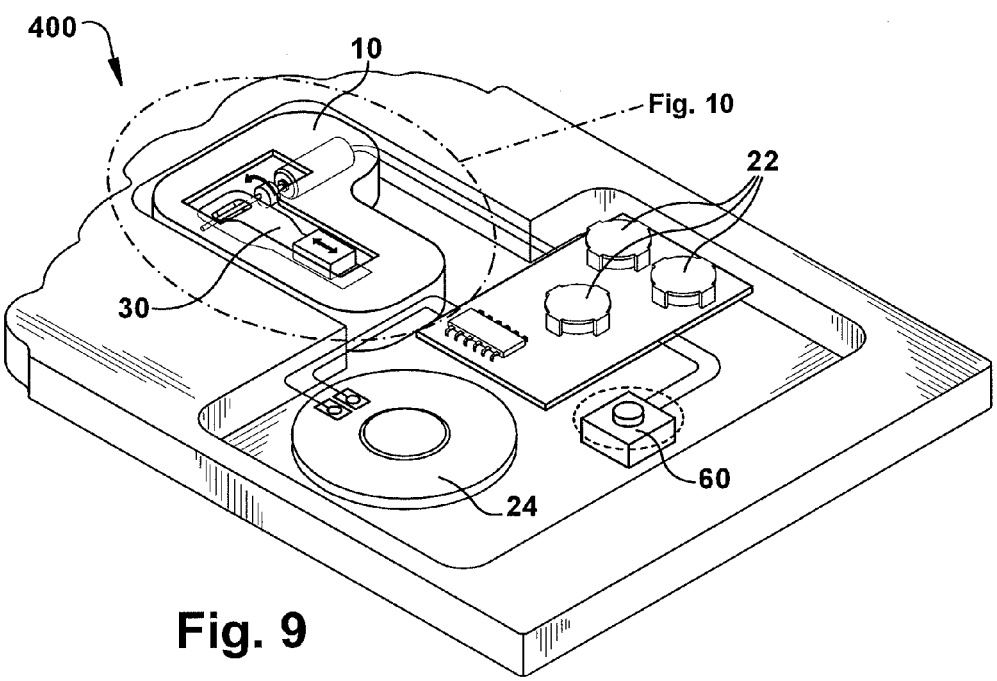
FIG. 9 is an internal view of the motion greeting card of FIG. 8.
Figure 12:
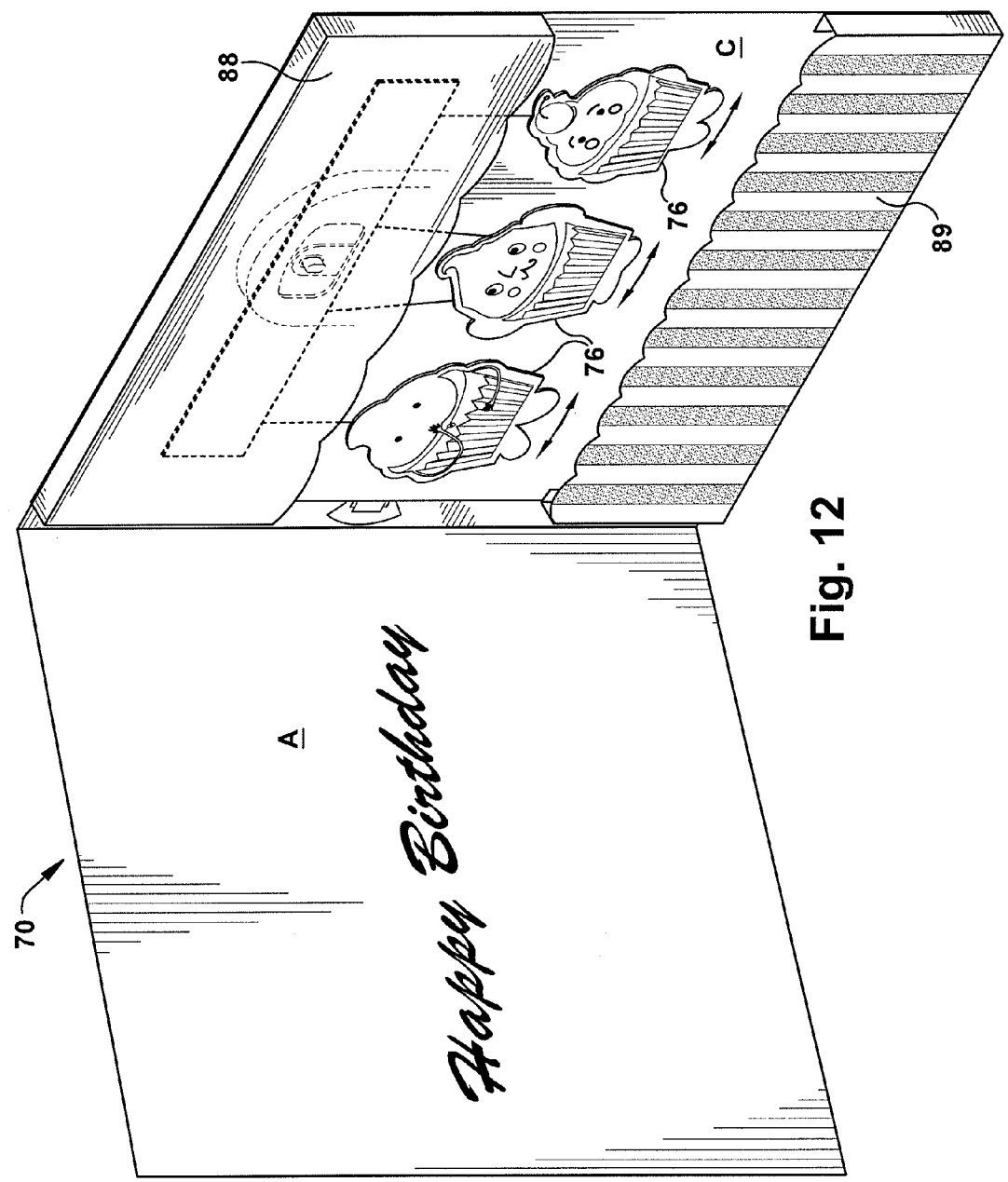
FIG. 12 is a perspective view of an alternate embodiment of the motion greeting cards of the present invention.
Figure 13:
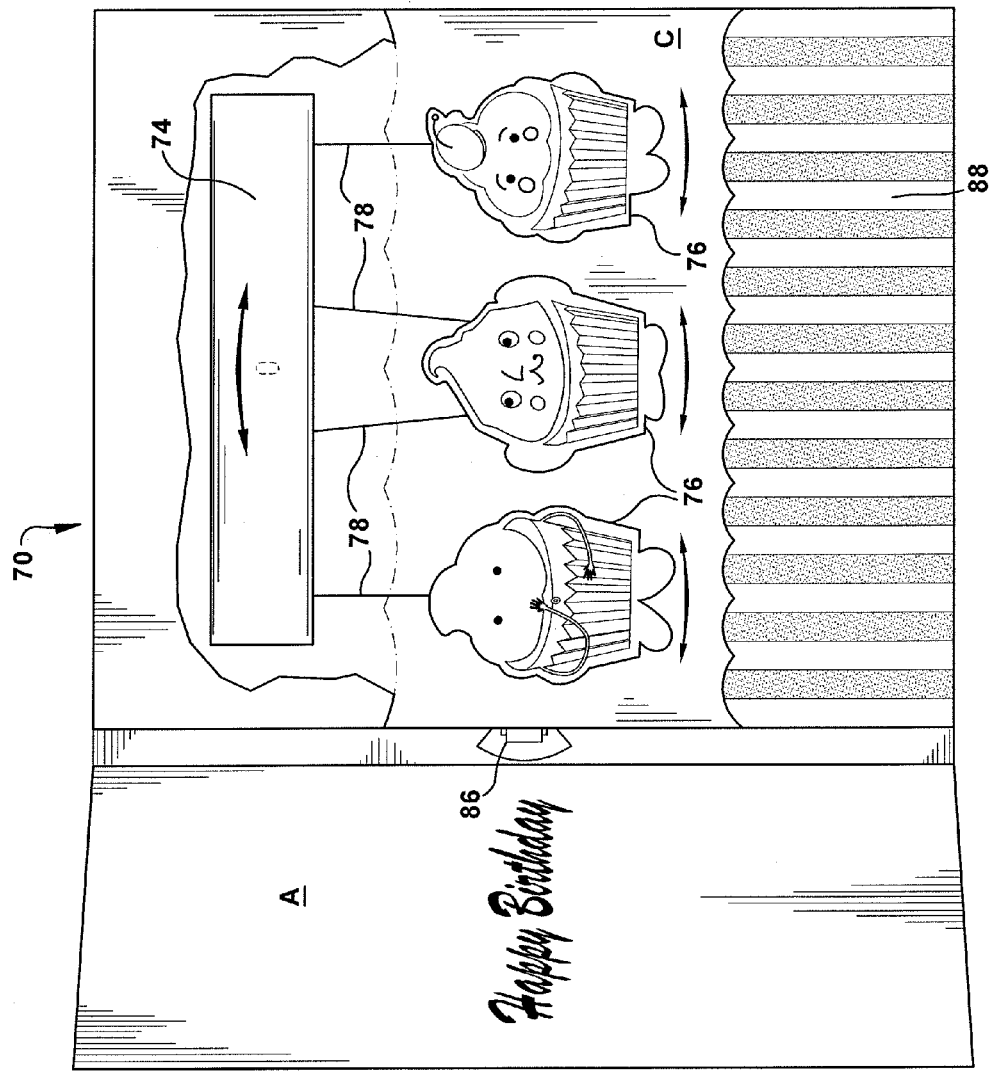
FIG. 13 is a front facing view of an inside panel of the motion greeting card of FIG. 12.
Figure 14:
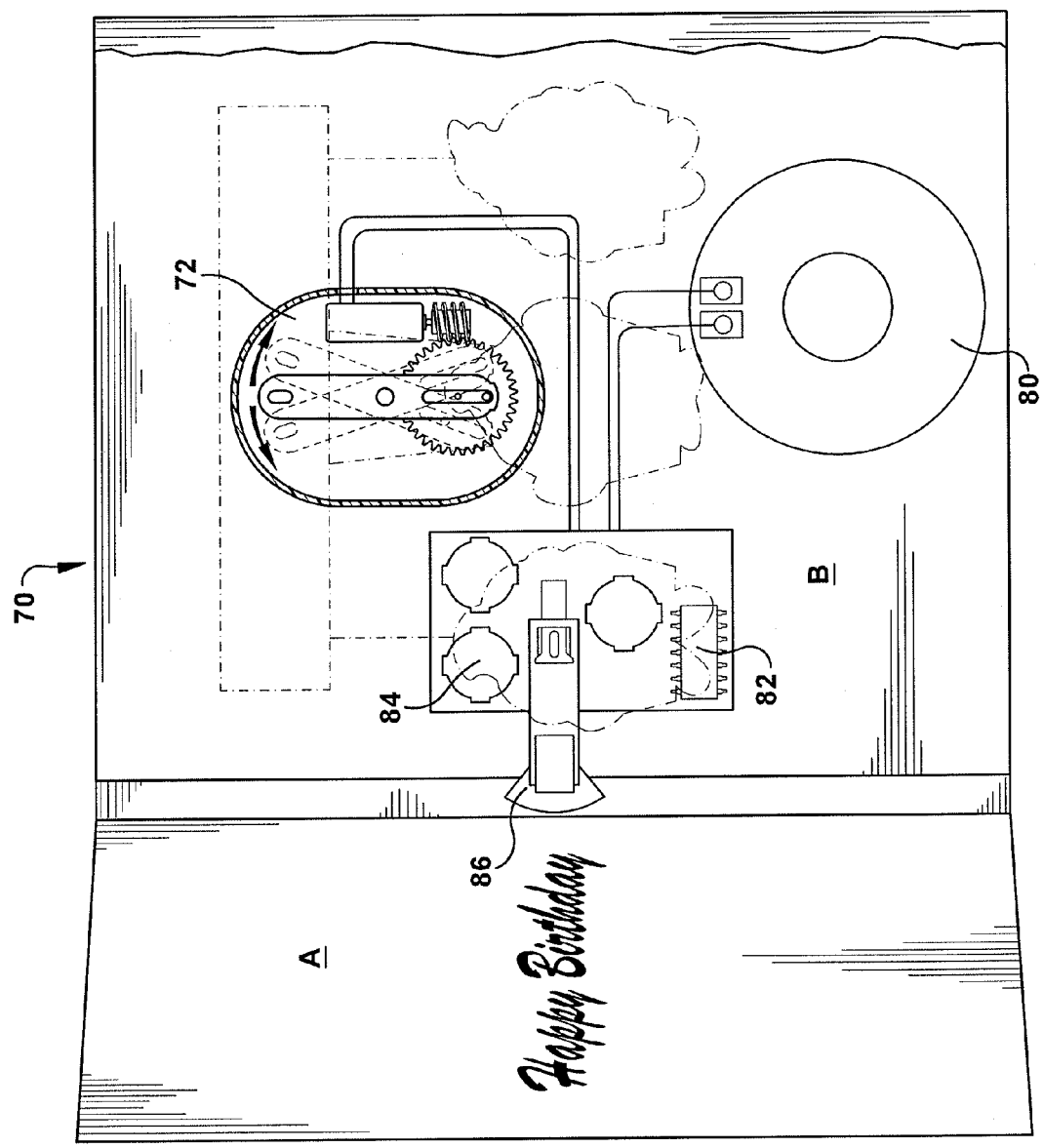
FIG. 14 is a front facing view of the electronic components of the motion greeting card of FIG. 12.
Figure 15:
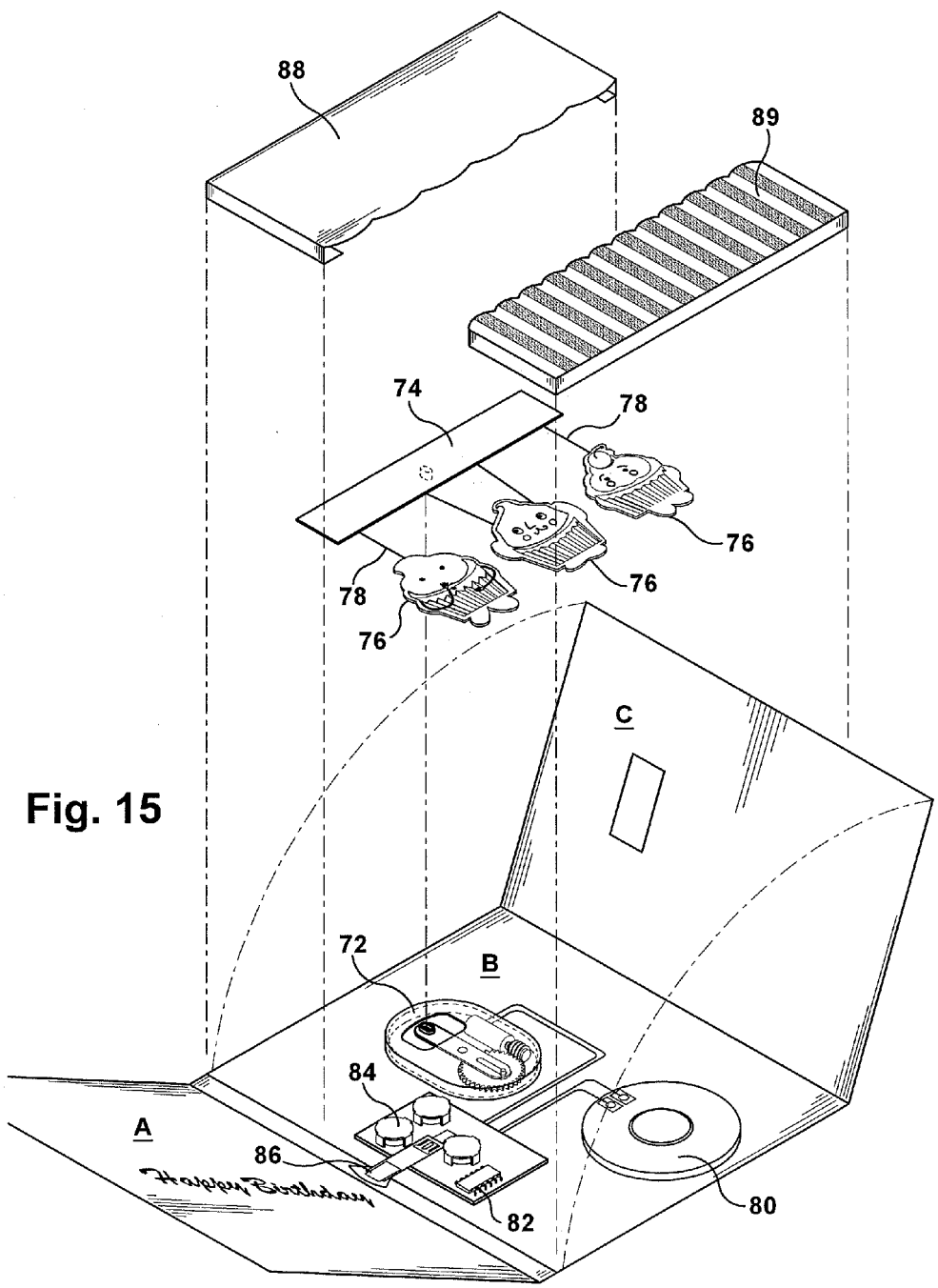
FIG. 15 is an exploded view of the motion greeting card of FIG. 12.

In a fourth embodiment, shown in FIGS. 7 and 8, the motion greeting card 400 of the present invention contains a motor module 56 that is associated with a three-dimensional card body 58 having one or more moving parts and designed as a character which, when activated moves in a reciprocating motion, thereby appearing to talk or sing. In this embodiment, the greeting card body 58 is substantially made of foam having a three-dimensional character printed on the front face of the card. When a user presses a push button 60 located on the front face of the greeting card, the audio and motor modules 56 are activated, causing the one or more moving parts to move in a reciprocating motion with respect to the greeting card body 58 thus the making it appear as though the character is talking or singing. A first greeting card panel is attached to the front surface of a foam encasement. The foam encasement houses and conceals the electronic components, including the sound and motor modules 56, of the greeting card 400. A second greeting card panel is connected to a third greeting card panel along a first fold line. The back surface of the second greeting card panel is attached to the back surface of the foam encasement such that the first and second greeting card panels and the foam encasement (which is located between the first and second greeting card panels) serves as the front cover or page of the greeting card and the third greeting card panel serves as the back page or panel of the greeting card. A separate fourth panel is attached via an attachment mechanism 66 to the front panel and serves as the mobile object 62. The panel 62 may be shaped like a mouth or may be shaped to correspond to the artwork printed on the front panel of the card such that when the motor module is activated, thereby moving the fourth panel in a reciprocating motion, it gives the illusion that the character is talking or singing. The fourth panel 62 may contain additional three-dimensional features such as moving eyes 64, etc. The motor 56 may be of the type shown in FIGS. 10 and 11 and described above as having a rotating arm 28 and movement mechanism 30 that is attached to the mobile object 62 or fourth panel 62 via an attachment mechanism 66.

In an alternate embodiment of the present invention, shown in FIGS. 12 through 15, the motion greeting card 70 includes one or more die cut shapes 76 which are suspended or dangled in free space from lever 74 which is attached to a motor module 72. While the moving items suspended from the lever 74 are described herein and shown in the figures as die cut shapes 76, any other type of lightweight novelty items may be used. The motor module 72, which may be of the type shown in FIG. 6, is attached via a connection arm to the lever 74. The die cut shapes 76 may be suspended from the lever 74 using one or more fiber optic strands 78, which are strong but also transparent. Other types of suspension mechanisms may be used such as string, wire, cable or any other suitable attachment mechanism. In a preferred embodiment the greeting card body structure contains three greeting card panels A, B, C which are folded to create an internal cavity between two of the greeting card panels B, C. The cavity contains and conceals the components of the sound and motor modules. The sound module is operative to store and playback one or more digital audio files. The motor module is operative to effect movement of a motor. These modules may include a circuit board 82, an integrated circuit, a microprocessor, a memory device, a speaker 80, a power source 84, a motor 72 and any other components, which are known to one of skill in the art, which are required to produce sound, motion or light. A slide switch 86 may be strategically placed between two panels A, B of the greeting card such that when a user opens the greeting card 70 by moving the front cover A away from the greeting card, the slide switch 86 initiates the sound and/or motor modules. The motor 72 may contain an attachment arm which serves to connect the motor 72 to a horizontal lever 74 through an opening in one of the greeting card panels. The connection arm attaches to the lever 74 at the approximate horizontal midpoint of the lever 74. When the motor 72 is activated it turns the lever 74 such that the opposing ends of the lever move in an opposite up-and-down or see-saw motion. One or more die cut pieces 76 or other lightweight items are attached or suspended from the lever 74 via fiber optic strands 78 or other flexible suspension mechanism, such that when the lever 74 is moved by operation of the motor 72, the die cut pieces 76 dangle and move in an up-and-down and/or back-and-forth motion. While three die cut shapes 76 of approximately the same size are described herein and shown in the figures, any number and size of die cut shapes may be used and the die cut shapes may be of the same or of different sizes and shapes. As shown in the figures, two die cut shapes 76 are each connected via a fiber optic strand 78 to each of the opposing ends of the lever 74. Another die cut shape 76 is connected via a fiber optic strand 78 which is loop through or connected along two sides of the die cut shape 76 to the approximate horizontal center of the lever 74. Slightly different movement patterns are created depending on the location of the suspension point between the die cut shape and the lever. The die cut pieces 76 may be shaped in any way to resemble various items, such as, for example, cupcakes as shown in the figures. To conceal the lever 74, the greeting card 70 also includes an upper panel 88 which extends across a top section of the inner greeting card panel C over the lever 74. The upper panel 88 may be shaped in any way, such as is shown in the figures, the upper panel 88 contains a scalloped lower edge which resembles a puppet show construct. A lower panel 89 is also attached to the inner greeting card panel C, extending across a bottom section of the greeting card. Pieces of foam or other lightweight material may be attached between the upper 88 and lower 89 panels and the inner panel C of the greeting card 70 to create stability and further strengthen those areas of the greeting card. As mentioned above, opening the greeting card 70 may initiate both the sound and motor modules. One or more pre-loaded digital audio files are contained in memory in the sound module and may be replayed upon opening the greeting card 70. The digital audio file may contain spoken words, songs, music, or any other recordable sound. Simultaneously, the motor module may be activated causing the motor 72 to move the lever 74 which in turn moves the die cut shapes 76. The die cut shapes 76 may appear to be "dancing" or otherwise moving to the music or sound. The movement of the motor 72 may be synchronized to the audio. Closing the greeting card ceases playback of the audio file and stops the motor 72. While the use of one switch has been described herein to simultaneously trigger initiation of the sound and motor modules, two separate switches may be used as well.

Figure 18:
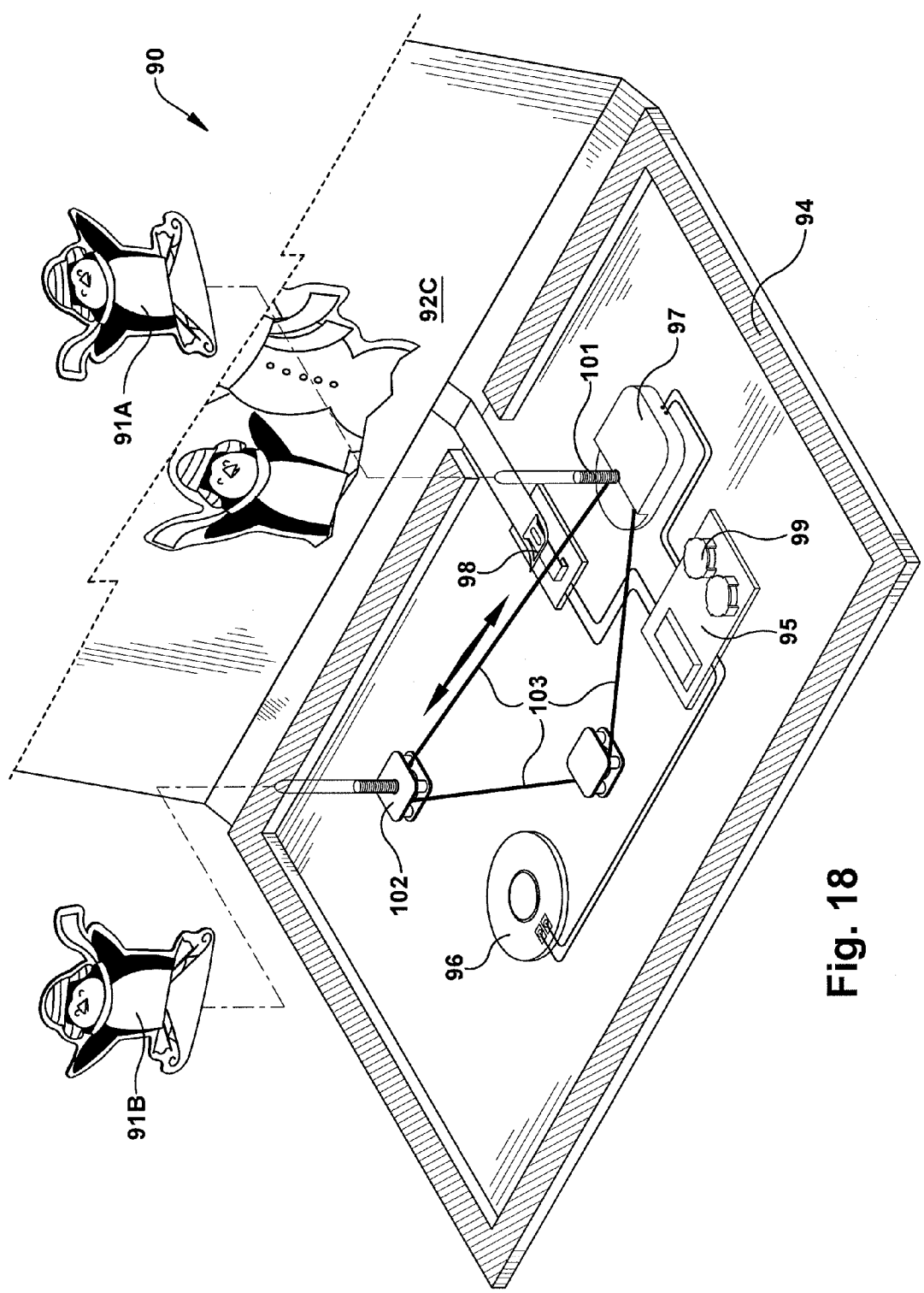
FIG. 18 is an exploded view of the greeting card of FIG. 16.

In another embodiment, shown in FIGS. 16-18, the motion greeting card 90 combines a pop-up greeting card structure with one or more moving components 91 and sound. The greeting card 90 includes a multi-panel greeting card body having various panels which are attached along a plurality of fold lines. In a preferred embodiment, there are three main greeting card panels 92 which are attached to one or more auxiliary panels 93 which serve as a perimeter of the greeting card 90. The greeting card 90 has a greater thickness than a traditional paper greeting card, due to the motor and other electronic components concealed within the greeting card. The greeting card panels 92 are wrapped around a support structure, the support structure 94 preferably made of one or more pieces of foam or other lightweight material. The support structure 94 houses and protects the electronic components of the greeting card 90 which are located within the boundaries of the support structure. Once the greeting card 90 is wrapped around the support structure 94, one main greeting card panel 92C is folded over the covered support structure along a fold line and serves as a front cover of the greeting card 90. The front greeting card panel 92C may be attached to the other greeting card panels (which are covering the support structure) along a vertical edge (to open/close about a vertical fold line in a right/left manner) or along a horizontal edge (to open/close about a horizontal fold line in an up/down manner). In the example shown in FIGS. 16-18, the front greeting card panel 92C is attached along a top horizontal edge of the support structure and folded downward over said support structure. The greeting card 90 may be opened by lifting the front greeting card panel 92C in an upward direction and the greeting card 90 may be closed by moving the front greeting card panel 92C in a downward direction over the support structure. The greeting card 90 may additionally contain a pop-up element 91 such as a die cut shape which is attached between two greeting card panels such that the die cut shape pops-up when the greeting card 90 is moved to an open position.

The support structure 94, as mentioned above, may include one or more pieces of foam or other foam-like structure which are positioned around the internal electronic components of the greeting card 90. Several foam pieces may be arranged in a substantially rectangular frame-like manner. This outer frame gives the greeting card a substantially rectangular shape. Other foam pieces may also be included within the frame-like structure to surround certain electronic components. While more than one foam piece is described, a single contiguous rectangular foam frame can be used as well. Inside the support structure, are the electronic components of the greeting card 90. These components may include, but are not limited to: a circuit board 95, an integrated circuit, a speaker 96, a memory device, a motor 97, a switch mechanism 98; a power source 99; and at least one pre-recorded digital audio file contained on the memory device. Other electronic components which are necessary for or which facilitate a moving motor and sound generation, which are known to one having skill in the art, may also be included. Generally, the thickness or height of each of the electronic components is less than the thickness of the support structure 94 such that the electronic components are contained within the support structure 94 and concealed by the greeting card panels 92. The motor module, in a preferred embodiment, is similar to the motor shown in FIGS. 4, 6 and 7, although other types of miniature motors may be used. In the present embodiment the motor 97 is connected to a spring 101 which extends outward from the motor 97 in a perpendicular configuration. A moving object 91A, such as the die cut piece shown herein, is attached to at least a portion of the spring 101 such that the moving object 91A will move when the motor 97 is activated. The spring 101 also provides flexibility to the moving object 91 such that when the greeting card 90 is in a closed position (shown in FIG. 16), the die cut moving object 91A can be moved into a prone position by the bending of the spring 101. The spring 101 is attached at one end to the motor 97 and extends outward in a perpendicular manner through an opening or aperture in one or more of the greeting card panels wherein it is attached (at least partially) to the movable die cut object 91A. Likewise, a second movable die cut object 91B is attached to a second spring 101 which is inserted through another opening or aperture in one or more greeting card panels 92 and attached to a spinning structure 102 which in combination with the motor 97 and a string 103 operates like a pulley. The spinning structure 102 is spaced apart from the motor 97 and the string mechanism 103 wraps around the motor 97 and also around the spinning structure 102. When the motor 97 is activated, the string mechanism 103 travels around the motor 97 and spinning structure 102 in a continuous closed loop, allowing the second movable die cut FIG. 91B to rotate without being directly attached to a second motor. The pulley-like mechanism may also include a second spinning structure which is spaced apart from the motor 97 and the first spinning structure 102 and is connected within the continuous loop. Other such mechanisms may be used to add additional moving figures or additional motors may be used as well. The greeting card 90 may have an inside surface which has an internal tray structure which is sunken in or located below the perimeter of the card's support structure. This gives the greeting card 90 a three-dimensional look and feel and also provides extra space into which the spring mechanisms 101 and die cut objects 91 can rest or lay when the greeting card 90 is in a closed position.

A switch mechanism, which in a preferred embodiment, is a slide switch mechanism 98 is located across one of a plurality of fold lines between the greeting card panels 92 such that when the greeting card 90 is opened by moving the cover greeting card panel 92C in an upward direction, the slide switch 98 triggers the motor 97 and sound modules, causing playback of at least one pre-recorded digital audio files and rotating movement of the two movable die cut objects 91A, 91B. The movable die cut objects 91A, 91B can be of any shape or size which enables them to reside wholly within the greeting card structure 90. In the example shown in the Figures, the die cut objects 91A, 91B are formed and decorated to resemble ice skating penguins.

The greeting card 90 may also contain a closing mechanism, such as a magnet, which attaches the cover greeting card panel 92C to the rest of the greeting card 90. A first magnet is contained within the cover greeting card panel 92C and a second magnet is contained within the greeting card panel or support structure below the location where the first magnet is located when the greeting card is in a closed position. The two magnets attract each other and maintain the greeting card in a closed position when they are in close proximity. To open the greeting card 90, a user must move the cover panel 92C away from the rest of the greeting card by applying a small force (to break the magnetic attraction between the first and second magnets) in an upward direction. When the greeting card 90 is in a closed position, the first and second spring mechanisms 101 (attached to the die cut objects 91) are bent or folded such that the die cut objects 91 lie prone between two greeting card panels 92. When the greeting card 90 is moved to an open position, the bent or folded springs 101 pop-back up and the die cut objects 91 are returned to an upright or vertical position. The spring action adds to the surprise upon opening the greeting card 90 (along with the die cut pop-up element described above).

In operation, when the greeting card 90 is opened, the slide switch mechanism 98 triggers activation of the sound and motor modules such that playback of the at least one pre-recorded digital audio file is initiated and movement of the motor 97 causes movement of the two die cut objects 91A, 91B. When the motor 97 is activated the spring 101, to which the die cut objects 91 are attached, is moved in a circular, rotating or spinning motions, giving the illusion that the die cut objects 91 (penguins) are skating on an ice rink. In a preferred embodiment, the die cut objects 91 will spin or move until the length of the audio file has been reached, at which time the sound is silenced and the die cut objects 91 cease movement. Closing and reopening the greeting card 90 will re-set the sound and motor modules. The at least one pre-recorded digital audio file may be music, a song, verbal speech, or any other recordable sound. The audio may be coordinated with the theme of the greeting card. For example, the greeting card shown in the Figures features ice skating penguins so the music may be a Christmas carol or other such song or music which relates to the holidays or winter season. The movement of the die cut objects 91 may also be synchronized with the pre-recorded audio file.

While this embodiment has been described as effectuating rotating or spinning motion, other types of motion, such as up and down motion, vibrating motion, or any other such movement can be effectuated by the motor module. Also, the number of moving objects can be reduced or increased and the shape of the die cut objects may be altered and still fall within the scope of the present invention. The die cut objects may also be replaced by a plastic molded figure, or any other type of three-dimensional adornment.

Although the switches described herein with respect to the examples given are described as being slide switches or push-button switches, the use of other types of switches is considered to be within the scope of this invention. Alternate switch mechanisms include, but are not limited to: light activated switches; sound activated switches; touch sensor switches; magnetic switches; and contact arm switches.

All variations of the motion greeting cards, including those described above, may additionally include a microphone and related electronics that would allow a user to record and save one or more personalized messages to be played before, during, after or in place of a pre-recorded sound clip. The personalized message may be played before a pre-recorded audio clip to, for example, introduce the pre-recorded audio clip or may be played after the pre-recorded audio clip to, for example, leave a personalized message to end the audio experience. The personalized message may also be played simultaneously with the pre-recorded audio clip wherein the user may sing-along to a pre-recorded song or instrumental audio clip, karaoke style. The personalized message may be triggered by the same switch mechanism that triggers the pre-recorded audio file or by a separate switch which may be a slide switch, a push button, a light-activated switch, motion sensor switch, or any other type of switch. The sound module may also include voice changing capabilities wherein a user may record a personalized message and then choose to alter the recorded voice message by increasing or decreasing the pitch or by speeding up or slowing down the cadence of the message. The sound module may also have the ability to store more than one personalized messages which can be played, in any combination before, during, after or in place of a pre-recorded audio clip. The additional messages may be triggered by the same trigger or by multiple trigger mechanisms.

Other variations of the motion greeting cards may include the addition of lights and additional pre-recorded digital audio files or additional mobile objects.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Other features and aspects of this invention will be appreciated by those skilled in the art upon reading and comprehending this disclosure. Such features, aspects, and expected variations and modifications of the examples are clearly within the scope of the invention where the invention is limited solely by the scope of the following claims.

What is claimed is:
1. A motion greeting card comprising:
a multi-panel greeting card body;
a sound module operative to store and playback at least one digital audio file;
a motor module operative to effect movement of one or more moveable objects, each of the one or more moveable objects attached to the motor module via a vertically positioned spring;
a switch mechanism operative to control activation of the sound and motor modules;
when the greeting card is in a closed position, the springs to which the one or more moveable objects are attached are bent in a horizontal direction such that the one or more moveable objects lie flat between two panels of the multi-panel greeting card body;
when the greeting card is moved to an open position, the springs return to a vertical position with the one or more moveable objects moving to an upright position, the sound module initiates playback of at least one digital audio file, and the motor module effectuates movement of the one or more moveable objects.

2. The motion greeting card of claim 1 further comprising a pop-up structure which can be moved between a first position wherein the pop-up structure is folded flat and a second position wherein the pop-up structure is unfolded into an upright position.

3. The motion greeting card of claim 2, wherein the pop-up structure is in the first position when the greeting card is closed and the pop-up structure in in the second position when the greeting card is opened.

4. The motion greeting card of claim 2, wherein the pop-up structure appears behind the one or more moveable objects.

5. The motion greeting card of claim 1 further comprising a protective structure which frames the sound and motor modules.

6. The motion greeting card of claim 5, wherein the protective structure has a greater thickness than the sound and motor modules.

7. A motion greeting card comprising:
a multi-panel greeting card body;
a sound module;
a motor module comprising a motor, a pulley and a belt;
a first moveable object attached directly to the motor;
a second moveable object attached to the pulley;

wherein upon opening the greeting card, the sound module initiates playback of at least one digital audio file and the motor module effects movement of the first and second moveable objects.

8. The motion greeting card of claim 7, wherein the first moveable object is attached to the motor module via a spring mechanism.

9. The motion greeting card of claim 8, wherein when the greeting card is in a closed position, the spring mechanism is bent in a horizontal direction so that the first and second moveable objects can move to a horizontal position, flat between two panels of the greeting card.

10. The motion greeting card of claim 9, wherein when the greeting card is opened, the first and second moveable objects spring back to an upright vertical position.

11. The motion greeting card of claim 7, wherein the at least one moveable object is a die cut shape.

12. The motion greeting card of claim 7, wherein a single motor moves the first and second moveable objects.

13. The motion greeting card of claim 7, wherein the first and second moveable objects move in a spinning motion.

14. The motion greeting card of claim 7 further comprising a magnetic closure mechanism.

15. The motion greeting card of claim 7 further comprising a pop-up structure located between two panels of the greeting card.

16. A motion greeting card comprising:
a multi-panel greeting card body;
a motor module comprising a motor, a pulley and a belt connecting the motor to the pulley;
at least two moveable objects, one of the moveable objects attached to the motor and one moveable object attached to the pulley;
wherein when the greeting card is in a closed position the at least two moveable objects lie flat within the multi-panel greeting card body and when the greeting card is in an open position, the at least two mobile objects move to an upright position and begin moving in a circular motion.

17. The motion greeting card of claim 16 further comprising a sound module operative to initiate playback of at least one digital audio file.

18. The motion greeting card of claim 17, wherein the sound module is activated upon opening the greeting card.

19. The motion greeting card of claim 16 further comprising a magnetic closure mechanism.

20. The motion greeting card of claim 16 further comprising a pop-up structure which moves between a first folded position and a second unfolded position upon opening the greeting card.

* * * * *